United States Patent
Worrall et al.

(10) Patent No.: US 9,532,262 B2
(45) Date of Patent: Dec. 27, 2016

(54) METHOD FOR PROVIDING MULTICAST BROADCAST SERVICES CONTINUITY IN A WIRELESS NETWORK, CORRESPONDING NETWORK NODE AND USER EQUIPMENT

(75) Inventors: Chandrika Worrall, Newbury (GB); Sudeep Palat, Swindon (GB)

(73) Assignee: Alcatel Lucent, Boulogne-Billancourt (FR)

(*) Notice: Subject to any disclaimer, the term of this patent is extended or adjusted under 35 U.S.C. 154(b) by 66 days.

(21) Appl. No.: 14/238,557

(22) PCT Filed: Jul. 18, 2012

(86) PCT No.: PCT/EP2012/064072
§ 371 (c)(1),
(2), (4) Date: Feb. 12, 2014

(87) PCT Pub. No.: WO2013/023864
PCT Pub. Date: Feb. 21, 2013

(65) Prior Publication Data
US 2014/0198645 A1    Jul. 17, 2014

(30) Foreign Application Priority Data
Aug. 12, 2011    (EP) .................... 11306041

(51) Int. Cl.
*G01R 31/08*    (2006.01)
*H04W 28/02*    (2009.01)
(Continued)

(52) U.S. Cl.
CPC ........... *H04W 28/0252* (2013.01); *H04W 4/06* (2013.01); *H04W 72/005* (2013.01);
(Continued)

(58) Field of Classification Search
CPC ....................................................... H04L 47/10
(Continued)

(56) References Cited

U.S. PATENT DOCUMENTS

2009/0239526 A1    9/2009    Zhao et al.
2010/0165963 A1*   7/2010    Chu .................... H04L 12/43
                                                          370/338

FOREIGN PATENT DOCUMENTS

CN    101635881 A      1/2010
EP    1 988 726 A2    11/2008
(Continued)

OTHER PUBLICATIONS

International Search Report for PCT/EP2012/064072 dated Sep. 7, 2012.
(Continued)

*Primary Examiner* — Samina Choudhry
(74) *Attorney, Agent, or Firm* — Fay Sharpe, LLP

(57) ABSTRACT

The present invention relates to a method for providing Multicast Broadcast Services continuity towards a user equipment part of a wireless network, said Multicast Broadcast Services being supported by at least one Multicast Broadcast Services bearer, said wireless network further providing Unicast Services to said user equipment, said Unicast Services being supported by at least one Unicast Service bearer, said Multicast Broadcast Services bearers being multiplexed with Unicast Services bearers on at least one carrier. According to the present invention, the method comprises the steps of prioritizing said Multicast Broadcast Services over said Unicast services.

17 Claims, 3 Drawing Sheets

Radio frame

Broadcast Multicast Serices bearer Subframe

Unicast Service bearer Subframe

(51) Int. Cl.
   *H04W 4/06*   (2009.01)
   *H04W 72/00*  (2009.01)
   *H04W 72/10*  (2009.01)
   *H04W 72/12*  (2009.01)
   *H04W 88/02*  (2009.01)
   *H04W 88/14*  (2009.01)

(52) U.S. Cl.
   CPC ........ *H04W 72/10* (2013.01); *H04W 72/1263* (2013.01); *H04W 88/02* (2013.01); *H04W 88/14* (2013.01)

(58) Field of Classification Search
   USPC .......................................................... 370/230
   See application file for complete search history.

(56) References Cited

FOREIGN PATENT DOCUMENTS

| | | | |
|---|---|---|---|
| EP | 2 276 275 A1 | 1/2011 | |
| TW | EP 2276275 A1 * | 1/2011 | .......... H04W 72/005 |

OTHER PUBLICATIONS

European Search Report for corresponding European Application No. 11306041.2, dated Feb. 22, 2012, 10 pages.

3GPP: "3rd Generation Partnership Project; Technical Specification Group Radio Access Network; Radio Resource Control (RRC); Protocol specification (Release 10)", 3GPP Draft; TS 25.331 V10.4.0, 25331-A40, 3rd Generation Partnership Project (3GPP), Mobile Competence Centre, Jul. 1, 2011 (Jul. 1, 2011), p. 355, XP002668384.

3GPP, "3rd Generation Partnership Project; Technical Specification Group Radio Access Network; Introduction of the Multimedia Broadcast/Multicast Service (MBMs) in the Radio Access Network (RAN); Stage 2 (Release 10)", 3GPP Standard; 3GPP TS 25.346 V10.0.0, 3rd Generation Partnership Project (3GPP), Mobile Competence Centre, No. V10.0.0, Mar. 15, 2011 (Mar. 15, 2011), pp. 20-21, XP002668385.

LG Electronics Inc: "Priority Handling for MBMS Service Continuity", 3GPP Draft; TSG RAN WG2 # 74, R2-113337 Prioirty Handling for Service Continuity_R0, 3rd Generation Partnership Project (3GPP), Mobile Competence Centre, May 3, 2011 (May 3, 2011), 2 pages, XP050495445.

Orange et al: "Priority scenarios for LTE MBMS service continuity", 3GPP Draft;TSG RAN WG2 Meeting #59, R2-073706—Priority Scenarios for LTE MBMS Service Continuity, 3rd Generation Partnership Project (3GPP), Mobile Competence Centre, Oct. 3, 2007 (Oct. 3, 2007), 2 pages, XP050260813.

* cited by examiner

METHOD FOR PROVIDING MULTICAST BROADCAST SERVICES CONTINUITY IN A WIRELESS NETWORK, CORRESPONDING NETWORK NODE AND USER EQUIPMENT

BACKGROUND OF THE INVENTION

The present invention relates in particular to a method for providing Multicast Broadcast Services continuity towards a user equipment part of a wireless network.

In modern communication networks as the 3G Long Term Evolution (LTE) defined as part of the 3GPP standardization, user equipments can be provided with either Unicast services or Multicast Broadcast Services or both simultaneously.

Unicast services are services which foresee a transmission of data and messages towards a single destination (e.g. a single mobile terminal in the case of a wireless network). Example of Unicast services are voice call, email, surfing on the Internet . . . .

Broadcast services are services where the transmitted data are readable by any destination (e.g. all mobile terminals in the wireless network can access these data). Example of Broadcast Services could be any service which does not require any registration and are available to all. GPS could be seem as such a broadcast service.

Multicast services are a middle way between Unicast and Broadcast services. Here only a group of destinations is addressed the same data and messages. Example of Multicast services could be TV streaming based on registration (often based on a fee) at a specific provider.

In wireless networks, Unicast and Broadcast/Multicast services are each associated with a bearer specifying the corresponding configuration of the physical Layer and the layer 2 in order to fulfill Quality of Services requirements for the different services.

The bearers are mapped onto physical carriers. One carrier may support several multiplexed bearers. This can be represented by different bearers are mapped on some disjoints sub frames in a radio frame. It is foreseen that. FIG. 1 shows a radio frame where bearers of different types (Unicast service or Broadcast Multicast services) are multiplexed on the same carrier. Subframes #0, #4, #5, #9 are allocated to Unicast Services while subframes #1, #2, #3, #6, #7, #8 are allocated to Broadcast Multicast Services.

In LTE, LTE-advanced networks, the Multicast Broadcast services are often referred as MBMS (Multimedia Broadcast Multicast Services) or e-MBMS (extended Multimedia Broadcast Multicast Services). It will be clear for a person skilled in the art that the present invention can be used in the context of LTE or LTE-advanced networks as well as in the context of other wireless communication networks which show the same multiplexing of Unicast and Multicast/Broadcast bearers on the same carrier.

In some cases, it may happen that the resources required for Unicast Service bearers increase leading in a congestion situation. Here a decision has to be made if the additional resource gets granted or not. In case the resource is granted then a further decision has to be made if other bearers need to be switched off. When Unicast and Broadcast Multicast services co-exist on the same carrier, prior art solutions always privilege Unicast services and possibly discontinue the Broadcast Multicast Services in case of resource limitation.

Especially if Broadcast Multicast Service is provided on a single frequency carrier, the wireless network must provide Unicast services on the same carrier for all connected user equipments which are not capable of carrier aggregation or dual reception. Given a large portion of subframe resources would be reserved for Broadcast Multicast Service for a lot of user equipments, resource limitation may be experienced for Unicast services.

The network design could minimise such resource limitation for Unicast services on carriers which simultaneously support Broadcast Multicast Service bearers.

One way to minimise the resource limitation for Unicast Services consists in distributing Broadcast Multicast Service bearers load on multiple carriers. For example, a highly popular Broadcast Multicast Service could be provided on a carrier where only a few subframes are allocated for Broadcast Multicast Services, leaving a large portion of subframe available for Unicast Services. Consequently, resource limitation for Unicast Services would happened rarely and the congestion on Unicast traffic would be kept under control. Other available Broadcast Multicast Service should consequently be allocated to other carriers.

Even though, the network design can minimise the possible resource limitation for Unicast services on a carrier shared with Broadcast Multicast Service bearers, a particular object of the present invention is to provide a method able to resolve the limitation on Unicast Service with minimum disturbance to the user experience for Broadcast Multicast Service experience.

Another object of the invention is to provide network node as well as user equipment mechanisms to resolve the issue addressed above while ensuring a continuity of the Broadcast Multicast Service in a wireless network.

SUMMARY OF THE INVENTION

These objects, and others that appear below, are achieved by a method for providing Multicast Broadcast Services continuity towards a user equipment part of a wireless network according to claim 1, a corresponding network Node according to claim 15 and a corresponding user equipment according to claim 16.

According to the present invention, Multicast Broadcast services are prioritized over Unicast services in case congestion would happen for Unicast services In a first embodiment of the invention, the User equipment sends out an indication requesting the wireless network to prioritize the Broadcast Multicast Services over the Unicast Service bearers.

In a second embodiment of the invention, the prioritization is performed by assigning priorities to all bearers destined to a user equipment, the priority assigned to Unicast services being lower than the priority assigned to at least one Broadcast Multicast Services.

In a third embodiment of the present invention, the prioritisation is achieved in that the wireless network sends out an indication that congestion happens for a Unicast Services destined to the user equipment, the user equipment being able to take the appropriate measure to keep the continuity of the Broadcast Multicast Services.

The method according to the present invention presents the advantage to provide user equipments a more flexible way of controlling the kind of Services they like to prioritize, knowing that more and more Broadcast Multicast Services may have the preference of the users over Unicast services at some point.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

The functions of the various elements shown in the Figures, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any boxes shown in the Figures are conceptual only. Their function may be carried out through the operation of program logic, through dedicated logic, through the interaction of program control and dedicated logic, or even manually, the particular technique being selectable by the implementer as more specifically understood from the context.

Figure 1:
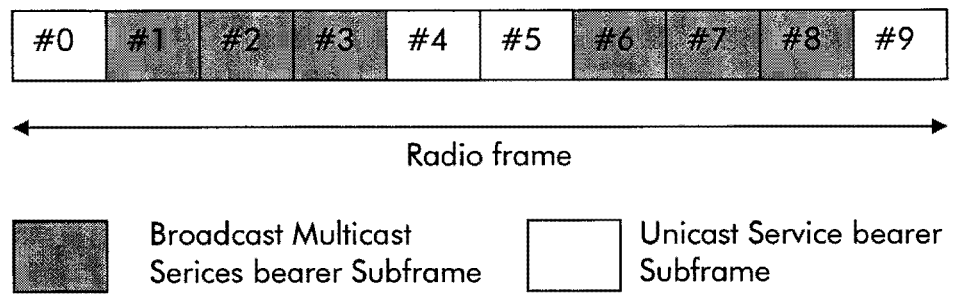
FIG. 1 shows a radio frame on a carrier multiplexing Broadcast/Multicast Service bearers subframes and Unicast Service bearers subframes.

FIG. 1 has been described in relation with the opening part of the description.

Figure 2:
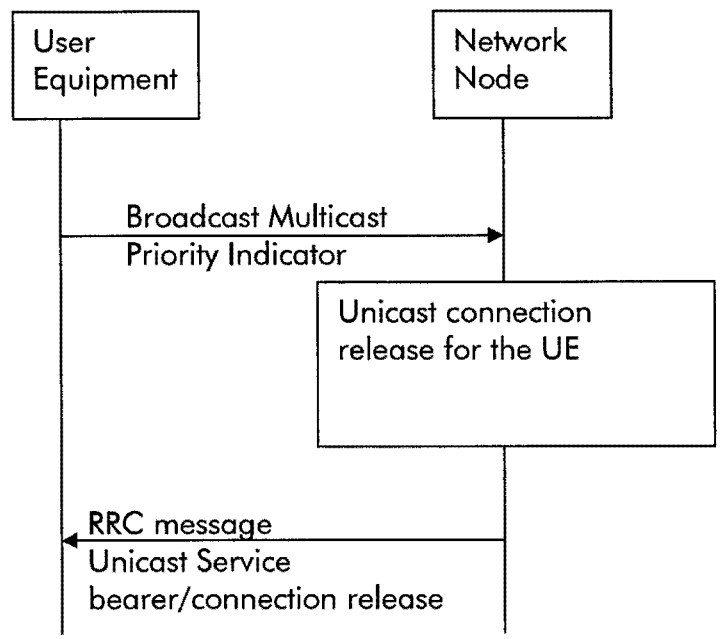
FIG. 2 shows a flow diagram illustrating a first embodiment of the present invention.

FIG. 2 shows a flow diagram illustrating a first embodiment of the present invention. In this embodiment, user equipment UE sends to Network Node NN an indication requesting that Multicast Broadcast Services are prioritised over Unicast Services. Preferably, this indication is part of a RRC signaling message. The indication itself may be represented by a single bit in the RRC message.

It will be understood by those skilled in the art that other types of messages can be used to convey the indication from the UE to the NN.

Upon notification of the network that the prioritisation of Multicast Broadcast Services should happen for the UE, the network node preferably checks if a congestion situation happens on the Unicast Service Bearers. If this is the case, the Network Nodes decides which Unicast bearers need to be switched off or deleted to ensure that the continuity of Multicast Broadcast Services towards the UE is not endangered.

In a further step, and in case of Unicast Service congestion, the Network Node sends a signaling message to the UE indicating one or more Unicast Service release. One possible signaling way is to use a RRC message.

In an advantageous embodiment, the RRC Unicast Service release message contains the reason of the release (i.e. release because of Multicast Broadcast Services prioritisation). This presents the advantage that the UE would avoids any attempt to re-establish the released Unicast Service bearer/and or connection as part of a recovery measure.

In the following, 3 possible implementations of the Unicast Service release will be explained.

The Unicast Service release can preferably done either at the Unicast Service bearer level or at the Unicast Service connection level or at both levels. In case the bearer is released the UE is still known at the network and the network keeps the UE info: security, id, etc. In case the connection is released, the UE doesn't have any established bearers to the network any more. Consequently the UE is known by the wireless network only at tracking area level since, releasing connection also clears up some stored info about the UE at the network side.

These Unicast Service release implementations are not exhaustive so that any other alternative obvious for a person skilled in the art in view of invention should also fall under the scope of the present invention.

In the following the description is made with reference to the Unicast Service bearer release. It will be clear for a person skilled in the art that a Unicast Service connection release would also apply. For simplicity reasons the cases of Unicast Service connection release will not be detailed below but is part of the scope of the present invention.

In a first alternative, the Unicast Service bearer release is reached by the Network Node requesting the UE to move to Idle mode. After resolving the congestion, the UE is informed that it can restore the Broadcast Multicast Service bearer. In this alternative, the UE cannot get any unicast service (including voice calls) during the period of congestion.

In a second alternative, the Unicast Service bearer release is reached in that all dedicated Unicast Service bearers are released but the default bearer is kept. The traffic mapped onto the default bearer is expected to be delivered with best effort. Some unicast Services on the default bearer may experience unavailability while the UE is receiving Broadcast/Multicast Services. Once congestion is relaxed, the dedicated Unicast Service bearers can be established. In this alternative, the UE cannot get any unicast service (including voice calls) during the period of congestion. Compared to the option above, this option does not require signaling of congestion in the RRC message informing on unicast connection release nor alleviation of congestion.

In a third alternative, the Unicast Service bearer release is reached in that only some dedicated Unicast Service bearers are released when the UE indicates its willingness to prioritise Broadcast Multicast Services over Unicast Services. This alternative provides a more flexible solution but is also more complex since it implies that a choice has to be done on which Unicast Service Bearers to release and which to keep. Here an assignment of priorities as described in the second embodiment of the present invention (in relation with FIG. 3) can be used to help selecting the bearers to release. This method requires signaling to keep the network updated on the dynamic priority values since the UE may change priority between the bearers frequently.

Advantageously, the signaling message requesting the prioritisation of Broadcast Multicast Services over Unicast may be interpreted at the network node depending on the network/operator policy or user subscription information. The method has consequently the potential to cater for each individual user requirements. Hence the unicast bearers which are released in a congestion situation may vary for user to user.

Figure 3:
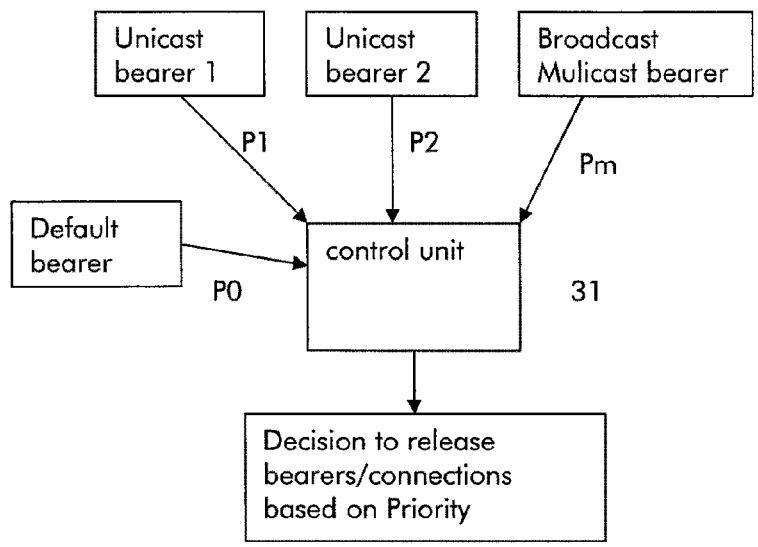
FIG. 3 shows a flow diagram illustrating a second embodiment of the present invention.

FIG. 3 shows a flow diagram illustrating a second embodiment of the present invention. According to this embodiment, a control unit 31 assigns priorities to the different bearers received by a user equipment. Typically the default bearer is assigned priority P0, Unicast bearers 1 resp 2 are assigned priority P1 resp P2 and Broadcast Multicast bearer is assigned priority Pm. In order to have Broadcast Multicast bearer prioritized over Unicast bearers P1 and P2, Pm should be at least higher than P1 or P2 or higher than both.

Upon detection of congestion, the network can start releasing the bearers having a low priority to ensure keeping continuity of Broadcast Multicast bearer.

In a preferred embodiment of the present invention, the default bearer is excluded from the mechanism of priority since it should not be released. Since however, it is foreseen that a best effort scheme applies to the default bearer, allocating to the default bearer a higher priority than to the Broadcast Multicast bearer would not endanger the continuity of the Broadcast Multicast service. Background traffic (eg email, facebook, etc) may most likely be mapped on the default bearer. The default bearer is non-GBR (non Guaranteed Bit Rate) and the traffic is delivered according to best effort. If resource is limited, the best effort traffic can be delayed. The default bearer must be maintained for RRC connected UEs. Even though the default bearer has higher priority than Broadcast Multicast services, the UE doesn't need to be handed over to another carrier to maintain the unicast connection since the default bearer is best effort bearer.

In LTE, Network based relative allocation/retention Priorities (ARP), so far exclusively used in the context of Unicast bearers, could be extended to Broadcast Multicast bearer so that a priority comparison among bearers of different nature is possible and so that the continuity of Broadcast Multicast bearer is ensured.

In a preferred embodiment, the priorities are controlled by an Operation and Maintenance Module in the network, however the priorities may be assigned by a network node or by the user equipment. In case the user equipment is assigning the priorities a signaling mechanism should be put in place to communicate the different priorities of the different bearers to the network node.

In case of a resource limitation on the carrier supporting the Broadcast Multicast bearers, the network may compare the priority of Unicast bearers to the priority of Broadcast Multicast bearers and choose which bearers to pre-empt. Preferably, the network is aware of the UEs who are receiving Broadcast Multicast service so that it can focus on these UEs. Hence, according to the present invention, the network may release some unicast bearers with a priority lower than the one of the Broadcast Multicast bearer.

If the resource limitation persists, and the UE finds no more Unicast bearers with lower priority than Broadcast Multicast, the network preferably hands over the UE to another frequency. This situation results in releasing Broadcast Multicast bearer for the corresponding UE based on relative priority.

Alternatively, in order to avoid the release of the Broadcast Multicast bearer and still continue to provide continuity of the Broadcast Multicast Service, one could use at this point a method according to the already described first embodiment in relation with FIG. 2.

In a further implementation of the above solution, the priority assigned to the Broadcast Multicast service bearers could take into account the user subscription information. Therefore, the solution could be catered for individual user requirements/subscription information. Additionally, it has potential to customise the priorities for the unicast bearers for a specific user taking into account the use of Broadcast Multicast service bearer and the associated priority.

This solution could be further enhanced considering implicit user selection/cooperation. For example, a user initiating a voice call is implicitly indicating it is higher priority than Broadcast Multicast service. The user can prioritise Broadcast Multicast service by terminating the voice call and then the network will move the user to the Broadcast Multicast service layer and provide lower service for the default bearer to allow the UE to select the Broadcast Multicast service layer. However, the implicit user interaction assumes that direct relationship between applications and high priority bearers is known by the user so that a user closing an application will result in the release of a bearer and the change in priorities of the remaining bearers.

Figure 4:
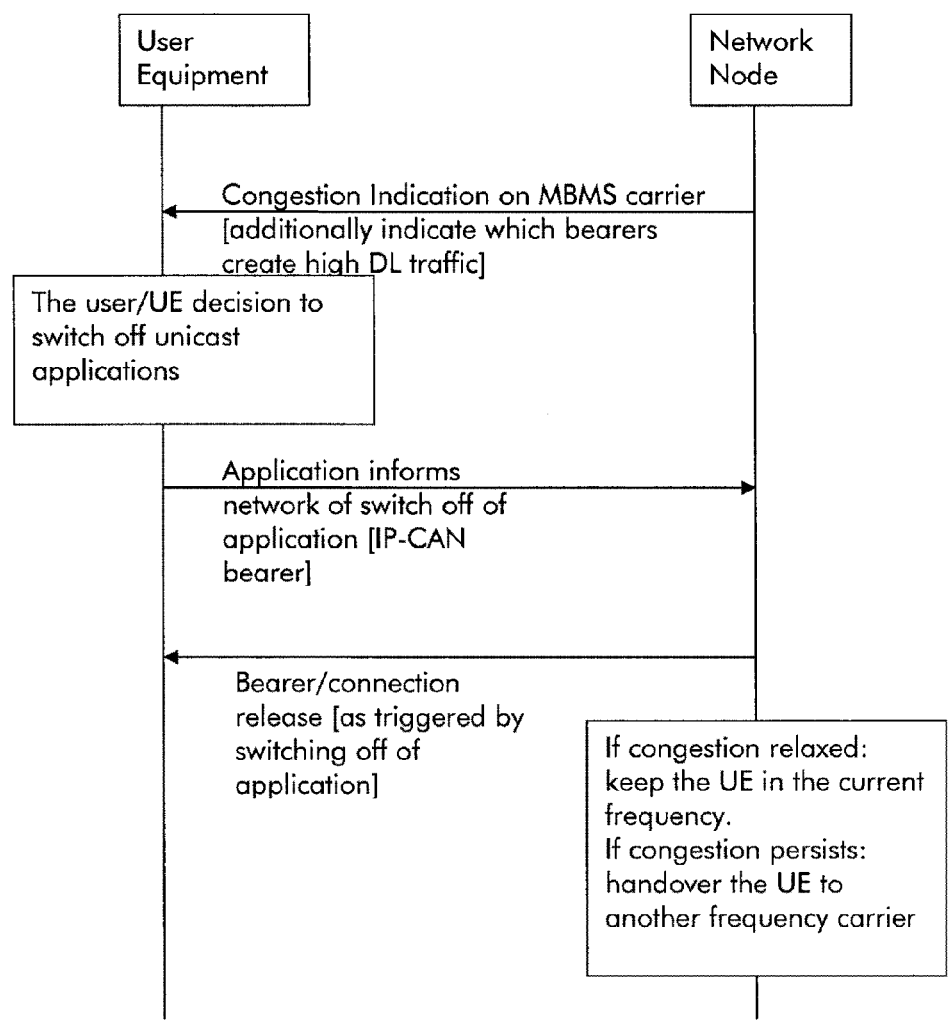
FIG. 4 shows a flow diagram illustrating a third embodiment of the present invention.

FIG. 4 shows a flow diagram illustrating a third embodiment of the present invention. According to this embodiment, the continuity of the Broadcast Multicast service is ensured by sending an indication of Unicast Service congestion on the carrier shared between the congested Unicast Service and the Broadcast Multicast Service. This congestion indication is sent from the network node to the User equipments which are receiving/interested in receiving a Broadcast Multicast service.

Either the congestion information can be broadcast in the cell, only the Broadcast Multicast interested UEs being intended to use the congestion information or the congestion information can be provided to the corresponding UEs who are receiving or willing to receive Broadcast Multicast service via dedicated RRC signaling, these UEs being known by the network node. The used RRC signaling could be either a dedicated RRC signaling or a cell broadcast RRC signaling.

Upon the reception of congestion indicator on Broadcast Multicast frequency carrier, the UEs who are willing to prioritise Broadcast Multicast services over Unicast switch off Unicast Services which are expected to have large amount of downlink traffic.

The application layer of the UE communicates to the network node the switching off of Unicast Services which eventually results in release of the associated bearers. This is performed at the application layer and may advantageously use IP-CAN bearer setup/modification/release procedure.

When the congestion is relaxed on the carrier, the UE should be informed in order to turn on the application released due to the congestion.

This third embodiment purely relies on the UE to switch off the unicast bearers. If any of the unicast bearers is not released, (except the default bearer) the network is required to handover the UE to another carrier to maintain the unicast connection.

To improve the performance, the network could indicate to the UE the release of which bearers may assist the resolving the congestion. Thus, the user makes the decision to switch off the application based on its interest (assuming the user is aware of the mapping between bearer and application).

It will be clear for those skilled in the art that any combination of two or more of the presented embodiments would solve the technical problem and is part of the scope of the present invention. For example, in addition to releasing some bearers based on priorities, the UE could also be informed of the congestion situation.

Figure 5:
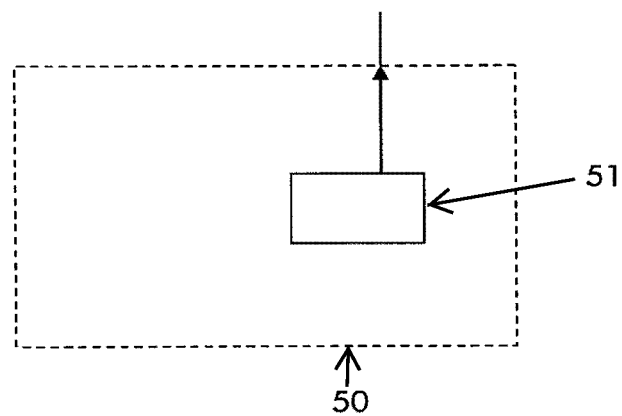
FIG. 5 shows an implementation of a network node according to the present invention.

FIG. 5 shows an implementation of a network node 50 according to the present invention. The Network Node is part of a wireless network and adapted to support Multicast Broadcast Services continuity towards a user equipment. The Multicast Broadcast Services are supported by at least one Multicast Broadcast Services bearer. The wireless network further provides Unicast Services to the user equipment. The Unicast Services are supported by at least one Unicast Service bearer. The Multicast Broadcast Services bearers are multiplexed with Unicast Services bearers on at least one carrier. According to the present invention the network node 50 comprise a control unit 51 adapted to prioritise the Multicast Broadcast Services over said Unicast services.

In a first embodiment, the control unit 51 reaches the prioritisation by assigning a priority to each bearer supporting a service at the user terminal. At least one of said Multicast Brodacast Services bearer is given a higher priority than the Unicast Services bearers. The priority is taken into account by the network node 50 for releasing bearers in case of congestion on said carrier, bearers with lower priority being released first.

In a second embodiment the control unit 51 reaches prioritisation by sending an indication of Unicast Service bearer congestion on the carrier shared with the Broadcast Muluticast Service to the user equipment.

Network Node 50 performs method steps as described in relations with the description of FIG. 2, 3, 4.

Figure 6:
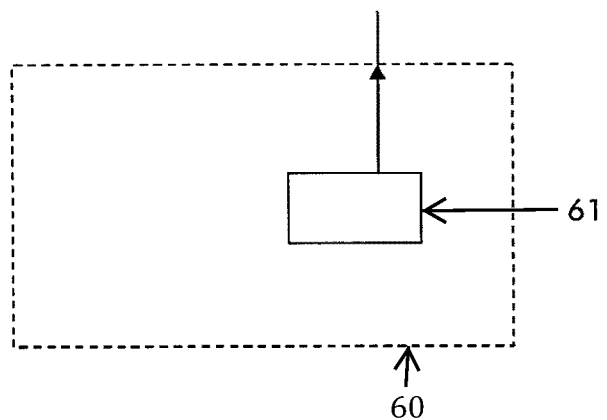
FIG. 6 shows an implementation of a user equipment according to the present invention.

FIG. 6 shows an implementation of a user equipment 60 according to the present invention. The user equipment is part of a wireless network and adapted to support Multicast Broadcast Services continuity. The Multicast Broadcast Services being supported by at least one Multicast Broadcast Services bearer. The user equipment is further provided with Unicast Services, the Unicast Services being supported by at least one Unicast Service bearer. The Multicast Broadcast Services bearers are multiplexed with Unicast Services bearers on at least one carrier. The user equipment comprises a module 61 adapted to request prioritisation of the Multicast Broadcast Services over said Unicast services. The module 61 comprises means for sending an indication to a network node requesting the Multicast Broadcast Services to be prioritised over the Unicast Services.

User Equipment 60 performs method steps as described in relations with the description of FIG. 2, 3, 4.

The invention claimed is:

1. Method for providing Multicast Broadcast Services continuity towards a user equipment part of a wireless network, said Multicast Broadcast Services being supported by at least one Multicast Broadcast Services bearer, said wireless network further providing Unicast Services to said user equipment said Unicast Services being supported by at least one Unicast Service bearer, said Multicast Broadcast Services bearers being multiplexed with Unicast Services bearers on at least one carrier, said method comprising:
   prioritising said Multicast Broadcast Services over said Unicast services, wherein said prioritising comprises sending an indication from said user equipment to said wireless network requesting said Multicast Broadcast Services to be prioritized over said Unicast Services, and wherein in case of congestion of said Unicast Services on said at least one carrier, said network releases at least one Unicast service bearer and/or one Unicast Connection.

2. Method according to claim 1, wherein a Unicast Service bearer is defined as default bearer for said user equipment, said default bearer still keeping priority over said Multicast Broadcast Services bearers.

3. Method according to claim 1, wherein said indication is sent through C signalling.

4. Method according to claim 1, wherein said user equipment is informed through signalling that the Unicast service bearer has been released because of said prioritising of said Multicast Broadcast Services over said Unicast Services, said method further comprising avoiding any attempt by said user equipment to re-establish said Unicast bearer as part of a recovery measure.

5. Method according to claim 1, wherein said user equipment is informed through signalling that the Unicast connection has been released because of said prioritising of said Multicast Broadcast Services over said Unicast Services, said method further comprising avoiding any attempt by said user equipment to re-establish said Unicast connection as part of a recovery measure.

6. Method according to claim 1, wherein said prioritising comprises assigning a priority to each bearer at said user terminal, said bearer being either a Multicast Broadcast Services bearer or a Unicast Services bearer, at least one of said Multicast Broadcast Services bearer having a higher priority than said Unicast Services bearers, said priority being taken into account for releasing bearers in case of congestion on said at least one carrier, bearers with lower priority being released first.

7. Method according to claim 6, wherein said priorities are assigned by the operation and maintenance module of said wireless network.

8. Method according to claim 6, wherein in case of congestion of Unicast Services on said at least one carrier, said network releases at least one Unicast Service bearer having a low priority.

9. Method according to claim 1, wherein said prioritising comprises sending an indication of Unicast Service bearer congestion on said at least one carrier, said user equipment switching off at least one Unicast Service bearer on said at least one carrier upon reception of said indication of congestion.

10. Method according to claim 9, wherein said indication of congestion is sent through dedicated RRC signalling.

11. Method according to claim 9, wherein said indication of congestion is sent through cell broadcast RRC signalling.

12. Method according to claim 9, wherein said user equipment releases at least one of said Unicast service bearers upon reception of said indication of congestion.

13. Network Node part of a wireless network adapted to support Multicast Broadcast Services continuity towards a user equipment, said Multicast Broadcast Services being supported by at least one Multicast Broadcast Services bearer, said wireless network further providing Unicast Services to said user equipment, said Unicast Services being supported by at least one Unicast Service bearer, said Multicast Broadcast Services bearers being multiplexed with Unicast Services bearers on at least one carrier, said network node comprising:
   a control unit comprising a processor adapted to prioritise said Multicast Broadcast Services over said Unicast services, said prioritisation being obtained by receiving an indication from said user terminal requesting said Multicast Broadcast Services to be prioritized over said Unicast Services, and in case of congestion of Unicast services on said at least one carrier, releasing at least one Unicast Service bearer and/or one Unicast connection OR said prioritisation being obtained by sending an indication of Unicast Service bearer congestion on said at least one carrier to said user equipment, and receiving a user equipment communication indicating the switching off of Unicast Services which results in release of the associated bearer.

14. User equipment part of a wireless network adapted to support Multicast Broadcast Services continuity, said Multicast Broadcast Services being supported by at least one Multicast Broadcast Services bearer, said user equipment being further provided with Unicast Services, said Unicast Services being supported by at least one Unicast Service bearer, said Multicast Broadcast Services bearers being multiplexed with Unicast Services bearers on at least one carrier, said user equipment comprising:
  a processor adapted to request prioritisation of said Multicast Broadcast Services over said Unicast services, said processor comprising a transmitter that sends an indication to said wireless network requesting said Multicast Broadcast Services to be prioritised over said Unicast Services, wherein in case of congestion of Unicast Services on said at least one carrier, said network releases at least one Unicast service bearer and/or one Unicast Connection.

15. A method for providing Multicast Broadcast Services continuity towards a user equipment part of a wireless network, said Multicast Broadcast Services being supported by at least one Multicast Broadcast Services bearer, said wireless network further providing Unicast Services to said user equipment, said Unicast Services being supported by at least one Unicast Service bearer, said Multicast Broadcast Services bearers being multiplexed with Unicast Services bearers on at least one carrier, said method comprising: prioritising said Multicast Broadcast Services over said Unicast services, wherein said prioritising comprises sending an indication from said user equipment to said wireless network requesting said Multicast Broadcast Services to be prioritised over said Unicast Services, wherein said prioritisation is obtained by sending an indication of Unicast Service bearer congestion on said at least one carrier to said user equipment, and receiving a user equipment communication indicating the switching off of Unicast Services which results in release of the associated bearer.

16. A User equipment part of a wireless network adapted to support Multicast Broadcast Services continuity, said Multicast Broadcast Services being supported by at least one Multicast Broadcast Services bearer, said user equipment being further provided with Unicast Services, said Unicast Services being supported by at least one Unicast Service bearer, said Multicast Broadcast Services bearers being multiplexed with Unicast Services bearers on at least one carrier, said user equipment comprising: a processor adapted to request prioritisation of said Multicast Broadcast Services over said Unicast services, said user equipment being configured to obtain prioritisation by receiving an indication of Unicast Service bearer congestion on said at least one carrier at said user equipment, switching off at least one Unicast Service bearer, and sending a user equipment communication indicating the switching off of the at least one Unicast Service bearer which results in release of the associated bearer.

17. The network node according to claim 13, wherein said prioritisation is further obtained by assigning a priority to each bearer at said user terminal, said bearer being either a Multicast Broadcast Services bearer or a Unicast Services bearer, at least one of said Multicast Broadcast Services bearer having a higher priority than said Unicast Services bearers, said priority being taken into account for releasing bearers in case of congestion on said at least one carrier, bearers with lower priority being released first.

* * * * *